(12) United States Patent
Ono et al.

(10) Patent No.: US 8,878,488 B2
(45) Date of Patent: Nov. 4, 2014

(54) CHARGE-AND-DISCHARGE CONNECTOR AND A VEHICLE IN WHICH CHARGE AND DISCHARGE ARE PERMITTED THROUGH THE CHARGE-AND-DISCHARGE CONNECTOR

(75) Inventors: Tomoya Ono, Toyota (JP); Shigeki Kinomura, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 9 days.

(21) Appl. No.: 13/566,625

(22) Filed: Aug. 3, 2012

(65) Prior Publication Data

US 2013/0106350 A1    May 2, 2013

(30) Foreign Application Priority Data

Oct. 31, 2011    (JP) .................................. 2011-239676

(51) Int. Cl.
  *H02J 7/00*     (2006.01)
  *B60L 11/18*    (2006.01)
  *H01M 10/48*    (2006.01)
  *H01M 10/44*    (2006.01)

(52) U.S. Cl.
  CPC .......... *B60L 11/1816* (2013.01); *Y02T 10/7005* (2013.01); *H01M 10/48* (2013.01); *Y02T 90/121* (2013.01); *Y02T 90/14* (2013.01); *Y02T 10/7088* (2013.01); *H01M 2220/20* (2013.01); *H01M 10/44* (2013.01)
  USPC ....................................................... 320/109

(58) Field of Classification Search
  USPC ............ 320/109, DIG. 11, DIG. 12, DIG. 34, 320/DIG. 35; 439/503; 429/52
  See application file for complete search history.

(56) References Cited

U.S. PATENT DOCUMENTS

| 8,368,352 B2* | 2/2013 | Ichikawa et al. ............... 320/109 |
| 2011/0121779 A1* | 5/2011 | Ichikawa et al. ............... 320/109 |

(Continued)

FOREIGN PATENT DOCUMENTS

| EP | 2605340 A1 * | 6/2013 |
| JP | 2001008380 A * | 1/2001 |

(Continued)

OTHER PUBLICATIONS

Sep. 26, 2012 Office Action issued in Japanese Patent Application No. 2011-239676 (with English Translation).

(Continued)

*Primary Examiner* — Yalkew Fantu
*Assistant Examiner* — Manuel Hernandez
(74) *Attorney, Agent, or Firm* — Oliff PLC

(57) ABSTRACT

The present invention has an objective to provide a charge-and-discharge connector which makes it possible to transfer of electric power mutually between vehicles and the vehicles exterior under control by a charge-and-discharge management system at normal times, and makes it possible to supply electric power from vehicles to the vehicles exterior without depending on the charge-and-discharge management system in an emergency. It is possible to make vehicles perform an electric supply operation without using a charge-and-discharge control signal in an emergency by preparing an operating part in a charge-and-discharge connector for delivering and receiving electric power between vehicles and the charge-and-discharge control device outside the vehicles and operating the operating part to make the vehicles detect that an electric supply operation is possible without using the charge-and-discharge control signal used for controlling charge and discharge at normal times.

20 Claims, 2 Drawing Sheets

(56) References Cited

U.S. PATENT DOCUMENTS

| | | | |
|---|---|---|---|
| 2012/0161701 A1* | 6/2012 | Kawamoto et al. | 320/109 |
| 2013/0069425 A1* | 3/2013 | Kanazawa | 307/9.1 |
| 2013/0106172 A1* | 5/2013 | Ono et al. | 307/9.1 |
| 2013/0162208 A1* | 6/2013 | Ohnuki | 320/109 |

FOREIGN PATENT DOCUMENTS

| | | | |
|---|---|---|---|
| JP | A-2001-8380 | | 1/2001 |
| JP | 2010035277 A | * | 2/2010 |
| JP | A-2010-35277 | | 2/2010 |
| JP | B1-5099279 | | 10/2012 |
| JP | A-2013-51753 | | 3/2013 |
| JP | A-2013-51754 | | 3/2013 |
| JP | A-2013-51772 | | 3/2013 |
| WO | WO 2013030637 A2 | * | 3/2013 |
| WO | WO 2013030646 A2 | * | 3/2013 |
| WO | WO 2013030653 A2 | * | 3/2013 |
| WO | WO 2013/057775 A1 | | 4/2013 |

OTHER PUBLICATIONS

"SAE Vehicle Recommended Practice", SAE Electric Vehicle and Plug in Hybrid Electric Vehicle Conductive Charge Coupler, SAE International, Jan. 2010, pp. 1-51.

"Electric vehicle conductive charging system general requirements", Japan Electric Vehicle Association Standard (JEVS), Mar. 9, 2001, pp. 1-30.

* cited by examiner

CHARGE-AND-DISCHARGE CONNECTOR AND A VEHICLE IN WHICH CHARGE AND DISCHARGE ARE PERMITTED THROUGH THE CHARGE-AND-DISCHARGE CONNECTOR

BACKGROUND OF THE INVENTION

1. Field of the Invention

The present invention relates to a charge-and-discharge management system which controls the charge and discharge between vehicles and the vehicles exterior. More specifically, the present invention relates to a charge-and-discharge connector which allows the transfer of electric power between vehicles and a charge-and-discharge control device outside the vehicles, and to a vehicle which can transfer electric power from and to the charge-and-discharge control device outside the vehicle through the charge-and-discharge connector.

2. Description of the Related Art

Electric vehicles carry an electric storage device (for example, a rechargeable battery, a capacitor, etc.) and run using the driving force generated from a power plant (for example, motor etc.) driven with the electric power stored in the electric storage device. As such electric vehicles, for example, an electric vehicle (EV), a hybrid vehicle (HV), etc. are included.

In such electric vehicles, the technology for charging the electric storage device carried in electric vehicles by the electric power supplied from external power supplies, such as commercial power supplied to each home (for example, source of supply of the comparatively low voltage of 100V or 200V grade), has been already developed. Hereinafter, vehicles which can charge the electric storage device (for example, battery etc.) carried in vehicles by the external power supply may be referred to as a "plug-in vehicle."

In addition, in hybrid vehicles (HVs), although the electric storage device carried in HV can be charged by driving a motor, which usually functions as a power generator, as the source of power, for example, by an internal-combustion engine or a regenerating brake etc. carried in HV, the electric storage device can be also charged by an external power supply as mentioned above. Such HV may be referred to as a plug-in hybrid vehicle (PHV).

In the art, as the standard of the electric vehicle which can charge an in-vehicle battery from a residence, "SAE Electric Vehicle Conductive Charge Coupler" (Non-Patent Literature 1) is enacted by SAE (Society of Automotive Engineers) in the United States of America, and "General Requirements for Conductive Charge System for Electric Vehicles" (Non-Patent Literature 2) is enacted also in Japan.

Moreover, in the Non-Patent Literature 1 and Non-Patent Literature 2, the standard about a control pilot (CPLT) is defined. The control pilot is defined as a control line which connects the control circuit of EVSE (Electric Vehicle Supply Equipment) supplying electric power from yard (in-plant) wiring to vehicles with the grounded part of vehicles through the control circuit on the side of vehicles and, based on the CPLT signal (pilot signal) which is communicated through the control line, the connection state of a charge cable, the propriety of the electric power supply from power supply to vehicles, and the amperage rating of EVSE, etc. are judged.

On the other hand, it has been proposed to supply electric power to external equipment (for example, a power supply, electric load, etc.) for electric power to be supplied from the electric storage device carried in electric vehicles as described above for the purpose of effective use of electric power from a viewpoint of environmental protection, etc., and relief of electric power shortage in the time of disaster etc. In other words, it has been proposed to use the electric storage devices carried in electric vehicles as electric supply equipment to external equipment for electric power to be supplied.

In this case, it is also possible to constitute the electric supply mechanism for supplying electric power to external equipment for electric power to be supplied from the electric storage device carried in electric vehicles separately from the charge mechanism for supplying electric power to the electric storage device carried in electric vehicles from external electric supply equipment (for example, commercial power etc.) to charge the electric storage device. However, establishing an electric supply mechanism separately from a charge mechanism in such a way may cause various problems, such as enlargement of vehicles, complication of electric supply/charge mechanism, increase in the manufacturing cost of vehicles, etc.

Then, various technologies, which make it possible to change between and perform the electric supply to external equipment for electric power to be supplied from vehicles and charge to the electric storage device carried in vehicles from external electric supply equipment in one mechanism, has been proposed in the art.

For example, the technology in which, by the energy management system (EMS: Energy Management System) which makes the power transmission possible mutually between the battery of an electric vehicle and a residence, it is judged whether the main controller on the side of the residence should be set in charge mode or discharge mode, a charge-and-discharge control signal is transmitted to the battery controller on the side of vehicles through a communications aerial (antenna) from the charge-and-discharge controller on the side of the residence, and based on the charge-and-discharge control signal received through the communications aerial, charge control or discharge control is performed on vehicles has been proposed (refer to Patent Document 1). However, forming a communications aerial separately in such a way causes increase in the manufacturing cost of the system, and complication of a control device.

Moreover, it is also possible to prepare the connector and inlet used on the charge to the electric storage device carried in vehicles from external electric supply equipment, separately from the connector and outlet used on the electric supply to external equipment for electric power to be supplied from vehicles, or to integrate the inlet and outlet carried in vehicles and preparing separately the connector for charge and the connector for electric supply to change between and perform the electric supply to external equipment for electric power to be supplied from vehicles and the charge to the electric storage device carried in vehicles from external electric supply equipment. However, even in such configurations, there is a possibility of causing problems, such as complication of a charge-and-discharge system and increase in a manufacturing cost, and misuse of a connector, etc.

Then, in the charge-and-discharge system of the vehicles which can charge the electric storage device carried in vehicles from the power supply outside the vehicles, and can supply electric power from the electric storage device to the power supply outside the vehicles or the electric load outside the vehicles, the technology in which the control signal (CPLT signal) for distinguishing whether an electric power cable is for charge or for electric supply is generated in the signal generation circuit that the charge-and-discharge system includes and, in accordance with the control signal provided from the signal generation circuit, the control device carried in vehicles controls a power converter by any in charge mode and electric supply mode has been proposed (refer to Patent Document 2).

However, in order to judge whether it is charge mode or electric supply mode based on a CPLT signal as mentioned above, a signal generation circuit must be able to generate a CPLT signal in both of charge mode and electric supply mode. On the other side, since a CPLT signal cannot be normally generated in the situation where the charge-and-discharge control device cannot operate normally due to, for example, the power failure in the time of a disaster, etc. or failure of a charge-and-discharge control device, etc., especially in such cases, it is desired to supply electric power to the power supply outside the vehicles or the electric load outside the vehicles from the electric storage device carried in vehicles. Nevertheless, in such cases, the electric storage device carried in vehicles cannot be charged by the power supply outside the vehicles, and electric power cannot be supplied to the power supply outside the vehicles or the electric load outside the vehicles from the electric storage device carried in the vehicles, either.

As mentioned above, in the art, there has been a continuous demand for a technology which makes it possible to transfer of electric power mutually between vehicles and the vehicles exterior under control by a charge-and-discharge management system at normal times, and makes it possible to supply electric power from vehicles to the vehicles exterior without depending on the charge-and-discharge management system in an emergency.

CITATION LIST

Patent Literature

[Patent Document 1] Japanese Patent Application Laid-Open (kokai) No. 2001-008380
[Patent Document 2] Japanese Patent Application Laid-Open (kokai) No. 2010-035277

Non-Patent Literature

[Non-Patent Literature 1] "SAE Electric Vehicle Conductive Charge Coupler", SAE Standards, SAE International, November, 2001 (USA)
[Non-Patent Literature 2] "General Requirements for Conductive Charge System for Electric Vehicles", Japan Electric Vehicles Association Standard (Japanese Electric Vehicles Standard), Mar. 29, 2001

SUMMARY OF THE INVENTION

Problem to Be Solved

As mentioned above, in the art, there has been a continuous demand for a technology which makes it possible to transfer of electric power mutually between vehicles and the vehicles exterior under control by a charge-and-discharge management system at normal times, and makes it possible to supply electric power from vehicles to the vehicles exterior without depending on the charge-and-discharge management system in an emergency.

The present invention has been conceived in order to meet such a demand. That is, the present invention has an objective to provide a charge-and-discharge connector which makes it possible to transfer of electric power mutually between vehicles and the vehicles exterior under control by a charge-and-discharge management system at normal times, and makes it possible to supply electric power from vehicles to the vehicles exterior without depending on the charge-and-discharge management system in an emergency. Moreover, the present invention has another objective to provide a vehicle which can transfer electric power mutually between the vehicle and its exterior under control by a charge-and-discharge management system at normal times, and can supply electric power from the vehicle to its exterior without depending on the charge-and-discharge management system in an emergency. Furthermore, the present invention has one more another objective to provide a charge-and-discharge management system which makes it possible to transfer of electric power mutually between vehicles and the vehicles exterior under control by the charge-and-discharge management system at normal times, and makes it possible to supply electric power from vehicles to the vehicles exterior without depending on the charge-and-discharge management system in an emergency.

Means for Solving the Problem

The above-mentioned one objective of the present invention can be achieved by a charge-and-discharge connector, which is used in a charge-and-discharge management system including a vehicle, an external power supply outside the vehicle, and a charge-and-discharge control device outside the vehicle, and electrically connects said vehicle and said charge-and-discharge control device to enable transfer of electric power between said vehicle and said charge-and-discharge control device, wherein;
said vehicle includes:
an in-vehicle power supply part comprising an electric storage device,
an in-vehicle charge-and-discharge control part which controls transfer of electric power between said vehicle and said charge-and-discharge control device, and
a connection part into which said charge-and-discharge connector is fitted,
said charge-and-discharge connector includes:
an electric power pathway through which electric power is transmitted between said in-vehicle power supply part and said charge-and-discharge control device,
a signal pathway through which a control signal is transmitted to at least one of said in-vehicle charge-and-discharge control part or said charge-and-discharge control device, and
a first operating part which is changed at least between a first state and a second state, and
said charge-and-discharge connector is configured so that, in a state where said charge-and-discharge connector and said connection part are electrically connected, said in-vehicle charge-and-discharge control part detects through said signal pathway:
a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or
a second control signal for permitting an electric supply operation to said charge-and-discharge control device from said in-vehicle power supply part without using said charge-and-discharge control signal, when said first operating part is in said second state.

Moreover, the above-mentioned another objective of the present invention can be achieved by a vehicle, which is used in a charge-and-discharge management system including the vehicle, an external power supply outside the vehicle, a charge-and-discharge control device outside the vehicle, and a charge-and-discharging connector, and enables transfer of electric power with said vehicle and said charge-and-discharge control device through said charge-and-discharge connector, wherein;

said vehicle includes:
an in-vehicle power supply part comprising an electric storage device,
an in-vehicle charge-and-discharge control part which controls transfer of electric power between said vehicle and said charge-and-discharge control device, and
a connection part into which said charge-and-discharge connector is fitted, said charge-and-discharge connector includes:
an electric power pathway through which electric power is transmitted between said in-vehicle power supply part and said charge-and-discharge control device,
a signal pathway through which a control signal is transmitted to at least one of said in-vehicle charge-and-discharge control part or said charge-and-discharge control device, and
a first operating part which is changed at least between a first state and a second state, and in a state where said charge-and-discharge connector and said connection part are electrically connected,
said in-vehicle charge-and-discharge control part detects through said signal pathway:
a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or
a second control signal for permitting an electric supply operation to said charge-and-discharge control device from said in-vehicle power supply part without using said charge-and-discharge control signal, when said first operating part is in said second state, and said in-vehicle charge-and-discharge control part controls said vehicle to be in:
a state where said charge operation or said electric supply operation can be performed based on said charge-and-discharge control signal, when said first control signal is detected, or
a state where said electric supply operation can be performed without being based on said charge-and-discharge control signal, when said second control signal is detected.

Furthermore, the above-mentioned one more another objective of the present invention can be achieved by a charge-and-discharge management system, which includes a vehicle, an external power supply outside the vehicle, a charge-and-discharge control device outside the vehicle, and a charge-and-discharging connector, wherein;

said vehicle includes:
an in-vehicle power supply part comprising an electric storage device,
an in-vehicle charge-and-discharge control part which controls transfer of electric power between said vehicle and said charge-and-discharge control device, and
a connection part into which said charge-and-discharge connector is fitted, said charge-and-discharge connector includes:
an electric power pathway through which electric power is transmitted between said in-vehicle power supply part and said charge-and-discharge control device,
a signal pathway through which a control signal is transmitted to at least one of said in-vehicle charge-and-discharge control part or said charge-and-discharge control device, and
a first operating part which is changed at least between a first state and a second state, and in a state where said charge-and-discharge connector and said connection part are electrically connected,
said in-vehicle charge-and-discharge control part detects through said signal pathway:
a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or
a second control signal for permitting an electric supply operation to said charge-and-discharge control device from said in-vehicle power supply part without using said charge-and-discharge control signal, when said first operating part is in said second state, and said in-vehicle charge-and-discharge control part controls said vehicle to be in:
a state where said charge operation or said electric supply operation can be performed based on said charge-and-discharge control signal, when said first control signal is detected, or
a state where said electric supply operation can be performed without being based on said charge-and-discharge control signal, when said second control signal is detected.

Effect of the Invention

As mentioned above, the present invention can make it possible to transfer of electric power mutually between vehicles and the vehicles exterior under control by a charge-and-discharge management system at normal times, and can make it possible to supply electric power from vehicles to the vehicles exterior without depending on the charge-and-discharge management system in an emergency.

DESCRIPTION OF THE PREFERRED EMBODIMENTS

Figure 1:
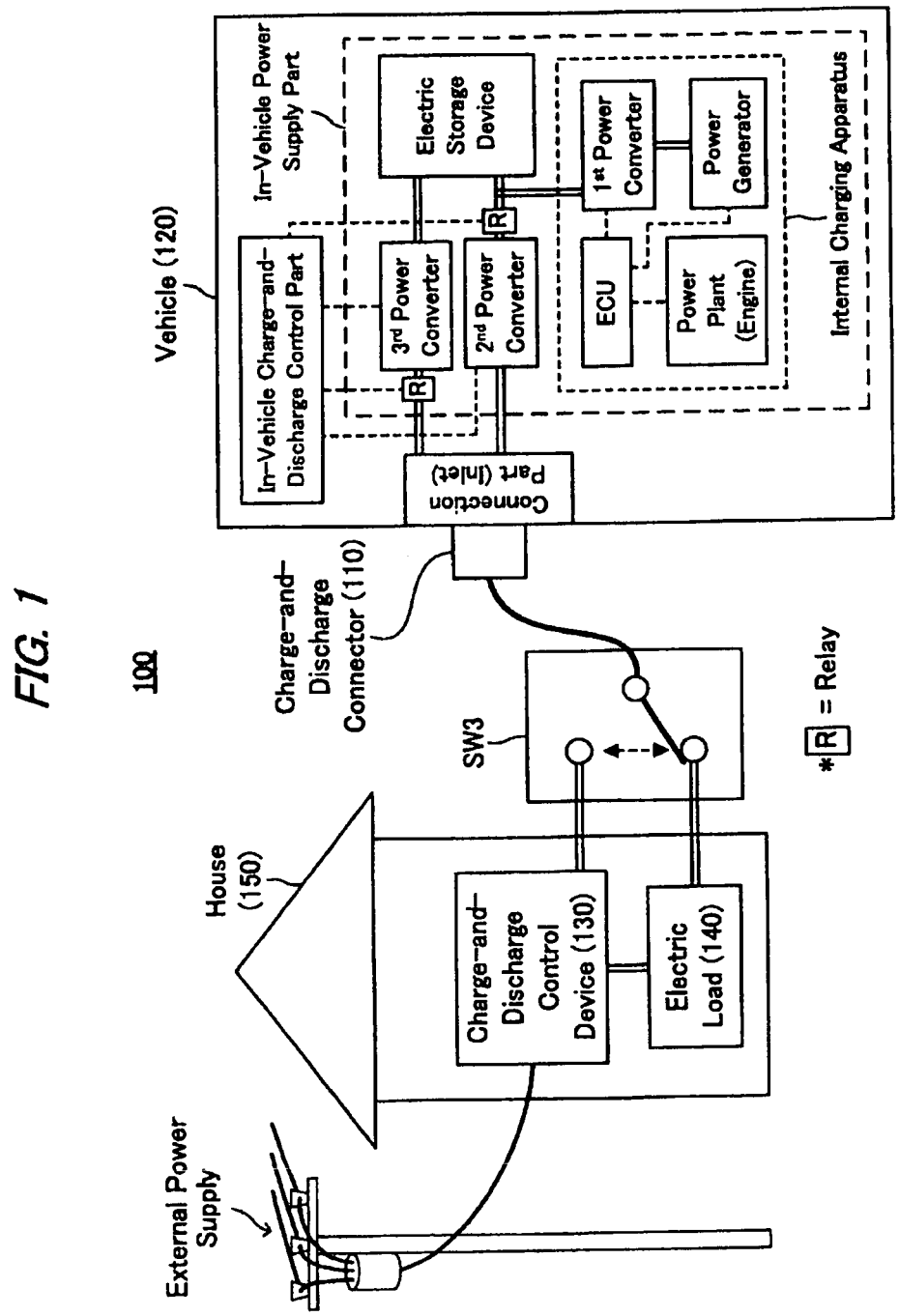
FIG. 1 is a schematic view showing the configuration of the charge-and-discharge management system according to one embodiment of the present invention.

As mentioned above, the present invention has an objective to provide a charge-and-discharge connector which makes it possible to transfer of electric power mutually between vehicles and the vehicles exterior under control by a charge-and-discharge management system at normal times, and makes it possible to supply electric power from vehicles to the vehicles exterior without depending on the charge-and-discharge management system in an emergency.

As a result of wholehearted research for achieving the above-mentioned purpose, the present inventors have found that it is possible to make vehicles perform an electric supply operation without using a charge-and-discharge control signal in an emergency by preparing an operating part in a charge-and-discharge connector for delivering and receiving electric power between vehicles and the charge-and-discharge control device outside the vehicles and operating the operating part to make the vehicles detect that an electric supply operation is possible without using the charge-and-discharge control signal used for controlling charge and discharge at normal times, and have conceived the present invention.

Namely, the first embodiment of the present invention is;

a charge-and-discharge connector, which is used in a charge-and-discharge management system including a vehicle, an external power supply outside the vehicle, and a charge-and-discharge control device outside the vehicle, and electrically connects said vehicle and said charge-and-discharge control device to enable transfer of electric power between said vehicle and said charge-and-discharge control device, wherein;

said vehicle includes:

an in-vehicle power supply part comprising an electric storage device, an in-vehicle charge-and-discharge control part which controls transfer of electric power between said vehicle and said charge-and-discharge control device, and a connection part into which said charge-and-discharge connector is fitted, said charge-and-discharge connector includes:

an electric power pathway through which electric power is transmitted between said in-vehicle power supply part and said charge-and-discharge control device, a signal pathway through which a control signal is transmitted to at least one of said in-vehicle charge-and-discharge control part or said charge-and-discharge control device, and a first operating part which is changed at least between a first state and a second state, and said charge-and-discharge connector is configured so that, in a state where said charge-and-discharge connector and said connection part are electrically connected, said in-vehicle charge-and-discharge control part detects through said signal pathway:

a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or a second control signal for permitting an electric supply operation to said charge-and-discharge control device from said in-vehicle power supply part without using said charge-and-discharge control signal, when said first operating part is in said second state.

As mentioned above, the charge-and-discharge connector according to the present embodiment is a charge-and-discharge connector which is used in a charge-and-discharge management system including a vehicle, an external power supply outside the vehicle, and a charge-and-discharge control device outside the vehicle, and electrically connects said vehicle and said charge-and-discharge control device to enable transfer of electric power between said vehicle and said charge-and-discharge control device. As a matter of course, a charge-and-discharge connector is electrically connected with a charge-and-discharge control device, for example, by cable etc.

The vehicle may be a vehicle classified, for example, as electric vehicles, such as a plug-in hybrid vehicle (PHV) or an electric vehicle (EV). As mentioned above, the vehicle includes an in-vehicle power supply part comprising an electric storage device, an in-vehicle charge-and-discharge control part which controls transfer of electric power between said vehicle and said charge-and-discharge control device, and a connection part into which said charge-and-discharge connector is fitted.

As mentioned above, the in-vehicle power supply part comprises an electric storage device. The electric storage device refers to, for example, a rechargeable battery, a capacitor, etc. Moreover, as mentioned above, the in-vehicle charge-and-discharge control part controls transfer of electric power between the vehicle and the charge-and-discharge control device. Specifically, for example, the in-vehicle charge-and-discharge control part receives a signal corresponding to the sign of the start or end of the charge from the charge-and-discharge control device outside the vehicle, transmits a signal corresponding to the sign of the start or end of the electric supply to the charge-and-discharge control device outside the vehicle, receives the maximum current capacity of the charge-and-discharge control device outside the vehicle, or transmits the maximum current capacity on the side of the vehicle. Moreover, the in-vehicle charge-and-discharge control part controls a relay etc. disposed in the electric power pathway between the in-vehicle power supply part and the connection part to constitute a charge pathway required for the charge from the charge-and-discharge control device outside the vehicles or an electric supply pathway required for the electric supply to the charge-and-discharge control device outside the vehicle, or adjust the current capacity flowing through these pathways, for example, according to the signals or the maximum current capacity.

Furthermore, as will be mentioned in detail later, the in-vehicle charge-and-discharge control part controls the power converter which the in-vehicle power supply part includes to transform the electric power supplied from the charge-and-discharge control device outside the vehicle into the electric power suitable for the electric storage device or transform the electric power to be supplied to the charge-and-discharge control device outside the vehicle into the electric power suitable for the electric load outside the vehicle for the electric power to be supplied.

As mentioned above, the connection part is fitted thereinto by the charge-and-discharge connector to electrically connect the in-vehicle power supply part and the in-vehicle charge-and-discharge control part, which the vehicle includes, with the charge-and-discharge control device. On the other hand, as mentioned above, the charge-and-discharge connector includes an electric power pathway through which electric power is transmitted between the in-vehicle power supply part and the charge-and-discharge control device, a signal pathway through which a control signal is transmitted to at least one of the in-vehicle charge-and-discharge control part or the charge-and-discharge control device, and a first operating part which is changed at least between a first state and a second state. Therefore, the connection part includes the terminal corresponding to each electric power pathway and signal pathway which the charge-and-discharge connector includes, respectively. That is, the connection part combines the role as an inlet to which a charge connector is connected and the role as an outlet to which a discharge connector is connected.

In addition, as mentioned above, the charge-and-discharge connector includes the signal pathway through which a control signal is transmitted to at least one of the in-vehicle charge-and-discharge control part or the charge-and-discharge control device. This means that all the signal pathways, which the charge-and-discharge connector includes, may not necessarily be the signal pathway through which either or both of the signal transmitted from the in-vehicle charge-and-discharge control part to the in-vehicle charge-and-discharge control part and the signal transmitted from the charge-and-discharge control device to the in-vehicle charge-and-discharge control part is transmitted. In other words, it means that the charge-and-discharge connector may include the signal pathway through which the signal detected only between the charge-and-discharge connector and the in-vehicle charge-and-discharge control part or between the charge-and-discharge connector and the charge-and-discharge control device is transmitted to the in-vehicle charge-and-discharge control part or the charge-and-discharge control device, respectively. For example, such a signal pathway may be a signal pathway, which can form a closed circuit between the charge-and-discharge connector and the in-vehicle charge-and-discharge control part or between the charge-and-discharge connector and the charge-and-discharge control device, and through which, according to the difference or change in a property (for example, impedance, capacitance, inductance, etc.) of such a circuit, a certain control signal is transmitted to the in-vehicle charge-and-discharge control part or the charge-and-discharge control device, respectively.

As mentioned above, the first operating part is changed at least between the first state and the second state. For example, the first operating part may be operated by a user to be changed at least between the first state and the second state and, as a specific example of such a first operating part, for example, a change-over switch etc. can be exemplified. In addition, as will be mentioned later, the state of the first operating part is detected by the in-vehicle charge-and-discharge control part through the signal pathway. Although the signal pathway, through which the signal corresponding to the state of the first operating part is transmitted to the in-vehicle charge-and-discharge control part, may be a dedicated signal pathway prepared separately in the charge-and-discharge connector, in order to reduce complication of the configuration and increase in the manufacturing cost of a charge-and-discharge connector, it is desirable that the signal pathway, through which the signal corresponding to the state of the first operating part is transmitted to the in-vehicle charge-and-discharge control part, can transmit the signal corresponding to the state of the first operating part to the in-vehicle charge-and-discharge control part through an existing signal pathway.

Such a signal pathway may be, for example, a signal pathway which can form a closed circuit between the charge-and-discharge connector and the in-vehicle charge-and-discharge control part and transmit a certain control signal to the in-vehicle charge-and-discharge control part according to the difference or change in a property (for example, impedance, capacitance, inductance, etc.) of such a circuit. In this case, the first operating part may be, for example, a change-over switch which intervenes in such a signal pathway and changes the connection state of a circuit element (for example, a resistor, a capacitor, an inductor, etc.) for changing the property of the circuit according to the state. Alternatively, the first operating part may be, for example, a change-over switch which intervenes in an existing signal pathway and can open up and shut off the signal pathway. In this case, the signal transmitted to the in-vehicle charge-and-discharge control part is a signal corresponding to the electrical connection state in the existing signal pathway, which changes according to the state of the first operating part. In addition, the signal corresponding to the state of the first operating part may be transmitted to in-vehicle charge-and-discharge control part through multiple signal pathways.

Thus, as mentioned above, the charge-and-discharge connector according to the present embodiment is configured so that, in a state where the charge-and-discharge connector and the connection part are electrically connected, the in-vehicle charge-and-discharge control part detects, through the signal pathway, a first control signal for permitting either one of a charge operation to the in-vehicle power supply part from the charge-and-discharge control device using a charge-and-discharge control signal transmitted and received between the in-vehicle charge-and-discharge control part and the charge-and-discharge control device or an electric supply operation to the charge-and-discharge control device from the in-vehicle power supply part using the charge-and-discharge control signal when the first operating part is in the first state, or a second control signal for permitting an electric supply operation to the charge-and-discharge control device from the in-vehicle power supply part without using the charge-and-discharge control signal when the first operating part is in the second state.

In other words, in accordance with the charge-and-discharge connector according to the present embodiment, in a state where the charge-and-discharge connector and the connection part are electrically connected, the in-vehicle charge-and-discharge control part detects, based on the signal corresponding to the state of the first operating part which is transmitted through the signal pathway, the fact that either one of a charge operation to the in-vehicle power supply part from the charge-and-discharge control device using a charge-and-discharge control signal transmitted and received between the in-vehicle charge-and-discharge control part and the charge-and-discharge control device or an electric supply operation to the charge-and-discharge control device from the in-vehicle power supply part using the charge-and-discharge control signal is permitted, when the first operating part is in the first state, or the fact that an electric supply operation to the charge-and-discharge control device from the in-vehicle power supply part without using the charge-and-discharge control signal is permitted, when the first operating part is in the second state.

Thus, as mentioned above, when the first operating part is in the first state, based on the charge-and-discharge control signal transmitted and received between the in-vehicle charge-and-discharge control part and the charge-and-discharge control device, under control by the charge-and-discharge control device, a charge operation to the in-vehicle power supply part from the charge-and-discharge control device or an electric supply operation to the charge-and-discharge control device from the in-vehicle power supply part is performed. Namely, when the first operating part is in the first state, a normal charge operation or electric supply operation in the charge-and-discharge management system is performed. On the other hand, when the first operating part is in the second state, without being based on the charge-and-discharge control signal transmitted and received between the in-vehicle charge-and-discharge control part and the charge-and-discharge control device, an electric supply operation to the charge-and-discharge control device from the in-vehicle power supply part is performed. Namely, when the first operating part is in the second state, apart from control by the charge-and-discharge control device, an electric supply operation to the charge-and-discharge control device from the in-vehicle power supply part is performed.

As mentioned above, in accordance with the charge-and-discharge connector according to the present embodiment, it is possible not only to perform a normal charge operation or electric supply operation in the charge-and-discharge management system when the first operating part is in the first state, but also to perform an electric supply operation to the charge-and-discharge control device from the in-vehicle power supply part, apart from control by the charge-and-discharge control device, when the first operating part is in the second state, even in the situation where the charge-and-discharge control device cannot operate normally due to, for example, the power failure in the time of a disaster, etc. or failure of a charge-and-discharge control device, etc. and therefore the electric power stored in the electric storage device which vehicles include can be effectively utilizable even in such cases.

By the way, as mentioned above, in the art, as the standard of the electric vehicle which can charge an in-vehicle battery from a residence, "SAE Electric Vehicle Conductive Charge Coupler" (Non-Patent Literature 1) is enacted by SAE in the United States of America, and "General Requirements for Conductive Charge System for Electric Vehicles" (Non-Patent Literature 2) is enacted also in Japan. Moreover, in the Non-Patent Literature 1 and Non-Patent Literature 2, the standard about a control pilot (CPLT) is defined. The control pilot is defined as a control line which connects the control circuit of EVSE supplying electric power from yard (in-plant) wiring to vehicles with the grounded part of vehicles through the control circuit on the side of vehicles and, based on the CPLT signal which is communicated through the control line, the connection state of a charge cable, the propriety of the electric power supply from power supply to vehicles, and the amperage rating of EVSE, etc. are judged.

The above-mentioned standard has spread widely in the art and, needless to say, it is industrially desirable that the charge-and-discharge management system using the charge-and-discharge connector according to the present embodiment also has the compatibility with has the above-mentioned standard as much as possible.

Therefore, the second embodiment of the present invention is;

a charge-and-discharge connector according to said first embodiment of the present invention, which is configured so that:

said signal pathway includes a CPLT signal pathway, through which a CPLT signal used for control of said charge-and-discharge management system is transmitted, and said charge-and-discharge control signal includes said CPLT signal.

In addition, as mentioned above, the present invention has an objective to provide a charge-and-discharge connector which makes it possible to transfer of electric power mutually between vehicles and the vehicles exterior under control by a charge-and-discharge management system at normal times, and makes it possible to supply electric power from vehicles to the vehicles exterior without depending on the charge-and-discharge management system in an emergency, such as a situation where the charge-and-discharge control device cannot operate normally due to, for example, the power failure in the time of a disaster, etc. or failure of a charge-and-discharge control device, etc. In order to attain the objective, the charge-and-discharge connector according to the present invention is intended to perform electric supply operation without using a charge-and-discharge control signal in an emergency by preparing the first operating part as mentioned above and operating the first operating part to make the vehicles detect that an electric supply operation is possible without using the charge-and-discharge control signal used for controlling charge and discharge at normal times.

As mentioned above, in a situation where the charge-and-discharge control device cannot operate normally due to, for example, the power failure in the time of a disaster, etc. or failure of a charge-and-discharge control device, etc., there is a possibility that a CPLT signal may not be sent correctly or may not be sent at all. Therefore, when a CPLT signal is detected by the in-vehicle charge-and-discharge control part on the side of vehicles in such a case, it may lead to an unexpected problem that, for example, an in-vehicle charge-and-discharge control part incorrectly recognizes that a charge connector is connected to the connection part despite an electric supply operation from an in-vehicle power supply part to a charge-and-discharge control device should be performed. Therefore, although the charge-and-discharge connector according to the present embodiment is configured so that its signal pathway includes a CPLT signal pathway through which a CPLT signal used for control of the charge-and-discharge management system is transmitted and the charge-and-discharge control signal includes the CPLT signal, it is desirable to make vehicles perform an electric supply operation without using the CPLT signal.

Then, the third embodiment of the present invention is;

a charge-and-discharge connector according to said second embodiment of the present invention, which is configured so that:

said CPLT signal pathway is shut off when said first operating part is in said second state.

As mentioned above, the charge-and-discharge connector according to the present embodiment is configured so that the CPLT signal pathway is shut off when the first operating part is in the second state. Thereby, as mentioned above, a possibility of leading to the unexpected problems as mentioned above can be avoided even when a CPLT signal may not be sent correctly or may not be sent at all, in an emergency, such as a situation where the charge-and-discharge control device cannot operate normally due to, for example, the power failure in the time of a disaster, etc. or failure of a charge-and-discharge control device, etc.

By the way, when the transfer of electric power between vehicles and a charge-and-discharge control device outside the vehicles through a charge-and-discharge connector, as in the present invention, it is very important that a charge-and-discharge connector is completely fitted into a connection part which vehicles include and the electrical connection between vehicles and the charge-and-discharge control device outside the vehicles is secured certainly. Therefore, also in the charge-and-discharge connector according to the present invention, it is desirable to prepare a signal pathway through which the signal corresponding to the fitting state of the connection part, which vehicles include, and the charge-and-discharge connector.

Namely, the charge-and-discharge connector according to the preferred modification of the present embodiment is;

a charge-and-discharge connector according to any one of said first to third embodiments of the present invention, wherein:

said signal pathway includes a connection signal pathway through which a cable connection signal whose property changes according to the fitting state of said charge-and-discharge connector and said connection part is transmitted.

In addition, as mentioned above, although the signal pathway, through which the signal corresponding to the state of the above-mentioned first operating part is transmitted to the in-vehicle charge-and-discharge control part, may be a dedicated signal pathway prepared separately in the charge-and-discharge connector, it is desirable that the signal corresponding to the state of the first operating part is transmitted to the in-vehicle charge-and-discharge control part through an existing signal pathway.

Namely, the charge-and-discharge connector according to the fourth embodiment of the present invention is;

a charge-and-discharge connector according to any one of said first to third embodiments of the present invention, which is configured so that:

said signal pathway includes a connection signal pathway through which a cable connection signal whose property changes according to the fitting state of said charge-and-discharge connector and said connection part is transmitted, and said property of said cable connection signal in a specific fitting state indicates a first property when said first operating part is in said first state, and indicates a second property different from said first property when said first operating part is in said second state.

As mentioned above, the charge-and-discharge connector according to the present embodiment is configured so that the signal pathway includes a connection signal pathway through which a cable connection signal whose property changes according to the fitting state of the charge-and-discharge connector and the connection part is transmitted, and the property of the cable connection signal in a specific fitting state indicates a first property when the first operating part is in the first state, and indicates a second property different from the first property when the first operating part is in the second state. Thereby, in accordance with the charge-and-discharge connector according to the present embodiment, the connection signal pathway enables to certainly assess the fitting state of the connection part, which vehicles include, and the charge-and-discharge connector, and further enables to transmit the signal corresponding to the state of the first operating part to the in-vehicle charge-and-discharge control part through the connection signal pathway. Thereby, in accordance with the charge-and-discharge connector according to the present embodiment, it becomes easier to secure the electrical connection between vehicles and a charge-and-discharge control device outside the vehicles and, in addition thereto, it is possible to transmit the signal corresponding to the state of the first operating part to the in-vehicle charge-and-discharge control part while reducing complication of the configuration and increase in the manufacturing cost of a charge-and-discharge connector.

By the way, in accordance with the charge-and-discharge connectors according to the above-mentioned various embodiments of the present invention, when the first operating part is in the first state, a first control signal for permitting either one of a charge operation from the charge-and-discharge control device to the in-vehicle power supply part using a charge-and-discharge control signal transmitted and received between the in-vehicle charge-and-discharge control part and the charge-and-discharge control device, or an electric supply operation from the in-vehicle power supply part to the charge-and-discharge control device using the charge-and-discharge control signal, is detected by the in-vehicle charge-and-discharge control part through the signal pathway. Thus, as mentioned above, when the in-vehicle charge-and-discharge control part detects the first control signal, the in-vehicle charge-and-discharge control part can control the vehicle to be in a state where the charge operation or the electric supply operation can be performed based on the charge-and-discharge control signal. Specifically, the in-vehicle charge-and-discharge control part can control, for example, a relay etc. disposed in the electric power pathway between the in-vehicle power supply part and the connection part to constitute a charge pathway required for the charge from the charge-and-discharge control device to the electric storage device which the in-vehicle power supply part includes, or an electric supply pathway required for the electric supply from the electric storage device which the in-vehicle power supply part includes to the charge-and-discharge control device.

On the other hand, when the first operating part is in the second state, a second control signal for permitting an electric supply operation from the in-vehicle power supply part to the charge-and-discharge control device without using the charge-and-discharge control signal is detected by the in-vehicle charge-and-discharge control part through the signal pathway. Thus, as mentioned above, when the in-vehicle charge-and-discharge control part detects the second control signal, the in-vehicle charge-and-discharge control part can control the vehicle to be in a state where the electric supply operation from the in-vehicle power supply part to the charge-and-discharge control device can be performed without being based on the charge-and-discharge control signal. Specifically, the in-vehicle charge-and-discharge control part can control, for example, a relay etc. disposed in the electric power pathway between the in-vehicle power supply part and the connection part to constitute an electric supply pathway required for the electric supply from the electric storage device which the in-vehicle power supply part includes to the charge-and-discharge control device.

Thus, the vehicle will be in the state where the electric supply to the charge-and-discharge control device can be started. However, after taking the possibility of an incorrect operation of the first operating part or an incorrect connection of electric load by a user, etc. into account, it is more desirable to prepare a step in which the in-vehicle charge-and-discharge control part receives a further signal corresponding to the sign of the start of an electric supply prior to the start of the electric supply to the charge-and-discharge control device.

The further signal corresponding to the sign of the start of the electric supply and the signal pathway through which the signal is transmitted are not limited to a specific signal or a specific signal pathway. Therefore, although the signal pathway through which the signal is transmitted to the in-vehicle charge-and-discharge control part may be a dedicated signal pathway prepared separately in the charge-and-discharge connector, in order to reduce complication of the configuration and increase in the manufacturing cost of a charge-anddischarge connector, it is desirable that the signal pathway through which the signal is transmitted to the in-vehicle charge-and-discharge control part is also an existing signal pathway. For example, the signal pathway through which the further signal corresponding to the sign of the start of the electric supply to the in-vehicle charge-and-discharge control part may be the above-mentioned connection signal pathway.

Namely, the fifth embodiment of the present invention is;

a charge-and-discharge connector according to said fourth embodiment of the present invention, wherein:

said charge-and-discharge connector further includes a second operating part which is changed at least between a first state and a second state, and said charge-and-discharge connector is configured so that, in the case where said first operating part is in said second state, said property of said cable connection signal in said specific fitting state indicates said second property when said second operating part is in said first state, and indicates a third property different from both of said first property and said second property when said second operating part is in said second state.

As mentioned above, the charge-and-discharge connector according to the present embodiment further includes a second operating part which is changed at least between a first state and a second state, and is configured so that, in the case where the first operating part is in the second state, the property of the cable connection signal in the specific fitting state indicates the second property when the second operating part is in the first state, and indicates a third property different from both of the first property and the second property when the second operating part is in the second state.

In accordance with the charge-and-discharge connector according to the present embodiment, in the state where the in-vehicle charge-and-discharge control part detects the second control signal when the first operating part is in the second state and thereby controls the vehicle to be in the state where the electric supply operation from the in-vehicle power supply part to the charge-and-discharge control device can be performed without being based on the charge-and-discharge control signal, for example, a user can operate the second operating part to change the second operating part between the first state and the second state, and thereby the in-vehicle charge-and-discharge control part can detect that the property of the cable connection signal in the specific fitting state changes between the second property and the third property, and thereby the in-vehicle charge-and-discharge control part can start the electric supply to the charge-and-discharge control device.

As mentioned above, in accordance with the charge-and-discharge connector according to the present embodiment, even if the in-vehicle charge-and-discharge control part has detected the second control signal when the first operating part is in the second state and has been controlling the vehicle to be in the state where the electric supply operation from the in-vehicle power supply part to the charge-and-discharge control device can be performed without being based on the charge-and-discharge control signal, the electric supply to the charge-and-discharge control device will not be started until the second operating part is operated and the in-vehicle charge-and-discharge control part detects that the property of the cable connection signal in the specific fitting state changes between the second property and the third property. Therefore, the unexpected trouble, as mentioned above, for example, due to an incorrect operation of the first operating part or an incorrect connection of electric load by a user, can be prevented from occurring.

In addition, in order to change the property of the cable connection signal between the second property and the third property, for example, a user may perform operation for changing the second operating part between the first state and the second state. In addition, it is necessary to thoughtfully set the operation to prevent the start of the electric supply from the in-vehicle power supply part to the charge-and-discharge control device due to an unintended contact to the second operating part etc. from occurring. For example, it can be supposed to bias the second operating part to be in the first state by elastic bodies, such as a spring, so that a user may operate an operating member, such as a button and a lever, for changing its state and thereby change its state into the second state and its state can return to the original first state with the bias by the elastic body when the operation is canceled.

In the above-mentioned case, for example, when a user touches the operating member accidentally and separates immediately, the state of the second operating part changes from the first state to the second state, and returns to the first state immediately. On this occasion, the property of the cable connection signal in the specific fitting state changes from the second property to the third property, and returns to the second property immediately. Therefore, in order for such a change of the property of the cable connection signal not to be incorrectly recognized as a signal corresponding to the sign which starts the electric supply from the in-vehicle power supply part to the charge-and-discharge control device, for example, what is necessary is to specify that the electric supply to the charge-and-discharge control device is started only when the property of the cable connection signal changes by a pattern with a low possibility of happening when a user touches the operating member accidentally.

For example, such a behavior pattern may be specified so that the electric supply to the charge-and-discharge control device is started only when a behavior pattern in which the property of the cable connection signal changes from the second property to the third property and returns to the second property is detected multiple times (for example, two times etc.) during a predetermined short period. Moreover, it may be specified so that, in addition to such an operation on the second operating part, an ignition-on operation on vehicles starts the electric supply to the charge-and-discharge control device.

By the way, in the charge-and-discharge connector according to the present embodiment, the property of the cable connection signal which changes according to the fitting state of the charge-and-discharge connector and the connection part may be, for example, impedance, capacitance, inductance, etc. In this case, the first operating part may be, for example, a change-over switch which intervenes in such a signal pathway and changes the connection state of a circuit element (for example, a resistor, a capacitor, an inductor, etc.) for changing the property of the circuit according to the state. Alternatively, the first operating part may be, for example, a change-over switch which intervenes in an existing signal pathway and can open up and shut off the signal pathway.

For example, when a resistor is used as the circuit element, and a projection part for locking the state where the charge-and-discharge connector according to the present embodiment is inserted and fitted into the connection part is prepared in the charge-and-discharge connector, and a depression for the projection part to be fitted thereinto is prepared at a region opposing the projection part of the connection part, and a lock release button for moving the projection part in the direction away from the depression to release the lock in the charge-and-discharge connector, and the lock release button is configured to interlock with the first operating part, the impedance of the connection signal pathway serves as the property of the cable connection signal which changes according to the fitting state of the charge-and-discharge connector and the connection part.

Namely, the sixth embodiment of the present invention is;

a charge-and-discharge connector according to any one of said fourth or fifth embodiment of the present invention, wherein:

said property of said cable connection signal which changes according to the fitting state of said charge-and-discharge connector and said connection part is the impedance of said connection signal pathway.

By the way, as mentioned above, as the standard of the electric vehicle which can charge an in-vehicle battery from a residence, "SAE Electric Vehicle Conductive Charge Coupler" (Non-Patent Literature 1) is enacted by SAE in the United States of America and, as charge a system for performing charge to the electric storage device carried in a plug-in hybrid vehicle (PHV) and an electric vehicle (EV), etc. which are spreading these days, those compliant with the standard enacted by SAE have becomes mainstream.

Among various standards enacted by SAE, as a standard about various control signals, a cable, a connector, etc. in a charge system which performs charge to the electric storage device carried in vehicles from external electric supply equipment, J1772 standard is enacted. These various control signals include, for example, a CPLT signal (pilot signal) for transmitting the connection state of a charge cable, the propriety of the electric power supply from a power supply to vehicles, the amperage rating of EVSE, etc. to a control circuit on the side of vehicles, a PISW signal (cable connection signal) for transmitting the information for judging the fitting state of a charge connector and a connection part (inlet) by means of the change of the impedance of the signal pathway, etc.

Among the various control signals, regarding the PISW signal, the change of the impedance of the signal pathway corresponding to the fitting state of a charge connector and a connection part (inlet) is detected, for example, by a detection means which a charge system for performing charge to the electric storage device carried in a vehicle from an external electric supply equipment, and the fitting state of a connector and a connection part is judged, for example, by the control device which the charge system includes, based on the detected value. That is, the signal pathway through which the PISW signal is transmitted corresponds to the above-mentioned connection signal pathway. Therefore, it is desirable to use the signal pathway through which the PISW signal is transmitted as the connection signal pathway in the charge-and-discharge connector according to the present embodiment.

Therefore, the seventh embodiment of the present invention is;

a charge-and-discharge connector according to said sixth embodiment of the present invention, wherein:

said cable connection signal and said connection signal pathway are compliant with J1772 standard enacted by SAE.

In addition, in the PISW signal pathway compliant with J1772 standard enacted by SAE, it is constituted so that the impedance of the PISW signal pathway detected by the in-vehicle charge-and-discharge control part carried in vehicles may fall gradually, as the fitting state of the charge connector and the connection part progresses in order of an unfitted state, a fitted state, and a connected state. Herein, the unfitted state refers to a state where the charge-and-discharge connector has disconnected itself of the connection part, and the fitted state refers to a state where the charge-and-discharge connector is inserted in the connection part, but the lock release button (for details, will be mentioned later) is pushed and the charge-and-discharge connector is not locked by the connection part, and the connected state refers to the state where the charge-and-discharge connector is inserted in the connection part and the charge-and-discharge connector is locked by the connection part.

Although the CPLT signal pathway and PISW signal pathway compliant with J1772 standard enacted by SAE are exemplified as examples of the signal pathways, which the charge-and-discharge connector according to various embodiments of the present invention include, in the previous explanation, it should not be interpreted that the signal pathway included in the charge-and-discharge connector, vehicle, and charge-and-discharge management system according to the present invention are limited to the signal pathways compliant with J1772 standard enacted by SAE and each signal pathway exemplified herein. That is, the charge-and-discharge connector, vehicle, and charge-and-discharge management system according to various embodiments of the present invention may include various signal pathways through which various signals with various formats and properties are transmitted, if needed.

By the way, as mentioned above, the present invention has another objective to provide a vehicle which can transfer electric power mutually between the vehicle and its exterior under control by a charge-and-discharge management system at normal times, and can supply electric power from the vehicle to its exterior without depending on the charge-and-discharge management system in an emergency. Then, the vehicles according to various embodiments of the present invention will be explained hereinafter. However, the contents which overlap with the matter that has been already described in the above-mentioned explanation about the charge-and-discharge connectors according to various embodiments of the present invention will be omitted and only the constituent elements of each embodiment will be listed.

First, the eighth embodiment of the present invention is;

a vehicle, which is used in a charge-and-discharge management system including the vehicle, an external power supply outside the vehicle, a charge-and-discharge control device outside the vehicle, and a charge-and-discharging connector, and enables transfer of electric power with said vehicle and said charge-and-discharge control device through said charge-and-discharge connector, wherein;

said vehicle includes:

an in-vehicle power supply part comprising an electric storage device, an in-vehicle charge-and-discharge control part which controls transfer of electric power between said vehicle and said charge-and-discharge control device, and a connection part into which said charge-and-discharge connector is fitted, said charge-and-discharge connector includes:

an electric power pathway through which electric power is transmitted between said in-vehicle power supply part and said charge-and-discharge control device, a signal pathway through which a control signal is transmitted to at least one of said in-vehicle charge-and-discharge control part or said charge-and-discharge control device, and a first operating part which is changed at least between a first state and a second state, and in a state where said charge-and-discharge connector and said connection part are electrically connected, said in-vehicle charge-and-discharge control part detects through said signal pathway:
a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or
a second control signal for permitting an electric supply operation to said charge-and-discharge control device from said in-vehicle power supply part without using said charge-and-discharge control signal, when said first operating part is in said second state, and
said in-vehicle charge-and-discharge control part controls said vehicle to be in:
a state where said charge operation or said electric supply operation can be performed based on said charge-and-discharge control signal, when said first control signal is detected, or
a state where said electric supply operation can be performed without being based on said charge-and-discharge control signal, when said second control signal is detected.

As mentioned above, the vehicles according to the present embodiment can make it possible to transfer of electric power mutually between vehicles and the vehicles exterior under control by a charge-and-discharge management system at normal times, and can make it possible to supply electric power from vehicles to the vehicles exterior without depending on the charge-and-discharge management system in an emergency.

Moreover, the ninth embodiment of the present invention is;
a vehicle according to said eighth embodiment of the present invention, wherein:
said signal pathway includes a CPLT signal pathway, through which a CPLT signal used for control of said charge-and-discharge management system is transmitted, and
said charge-and-discharge control signal includes said CPLT signal.

Furthermore, the tenth embodiment of the present invention is;
a vehicle according to said ninth embodiment of the present invention, wherein:
said charge-and-discharge connector is configured so that said CPLT signal pathway is shut off when said first operating part is in said second state, and
in the case where the first operating part is in the second state, said in-vehicle charge-and-discharge control part uses the fact that said CPLT signal is not detected, as one of the conditions for controlling said vehicle to be in the state where said electric supply operation can be performed.

In addition, the eleventh embodiment of the present invention is;
a vehicle according to any one of said eighth to tenth embodiments of the present invention, wherein:
said charge-and-discharge connector is configured so that:
said signal pathway includes a connection signal pathway through which a cable connection signal whose property changes according to the fitting state of said charge-and-discharge connector and said connection part is transmitted, and said property of said cable connection signal in a specific fitting state indicates a first property when said first operating part is in said first state, and indicates a second property different from said first property when said first operating part is in said second state, and
in the case where the first operating part is in the second state, said in-vehicle charge-and-discharge control part uses the fact that said property of said cable connection signal in said specific fitting state indicates said second property, as one of the conditions for controlling said vehicle to be in the state where said electric supply operation can be performed.

Moreover, the twelfth embodiment of the present invention is;
a vehicle according to said eleventh embodiment of the present invention, wherein:
said charge-and-discharge connector:
further includes a second operating part which is changed at least between a first state and a second state, and
is configured so that, in the case where said first operating part is in said second state, said property of said cable connection signal in said specific fitting state indicates said second property when said second operating part is in said first state, and indicates a third property different from both of said first property and said second property when said second operating part is in said second state, and
in the case where the first operating part is in the second state, said in-vehicle charge-and-discharge control part control said vehicle to perform said electric supply operation when said property of said cable connection signal in said specific fitting state changes between said second property and said third property.

Furthermore, the thirteenth embodiment of the present invention is;
a vehicle according to any one of said eleventh or twelfth embodiment of the present invention, wherein:
said property of said cable connection signal which changes according to the fitting state of said charge-and-discharge connector and said connection part is the impedance of said connection signal pathway.

In addition, the fourteenth embodiment of the present invention is;
a vehicle according to said thirteenth embodiment of the present invention, wherein:
said cable connection signal and said connection signal pathway are compliant with J1772 standard enacted by SAE.

By the way, as mentioned above, the vehicle according the present invention may be, for example, a plug-in hybrid vehicle (PHV). PHV and HV are vehicles equipped with, for example, an electric motor driven with electric power and an internal-combustion engine driven with kinetic energy converted from the energy generated by combustion of fuel, as power plants. In these hybrid cars, the internal charging apparatus carried in the vehicles can charge the electric storage device carried in the vehicles. Thus, vehicles equipped with an internal charging apparatus which can charge an electric storage device can charge the electric storage device while supplying electric power stored in the electric storage device to the vehicles exterior and therefore they can continue electric supply operation for a longer period as compared with the vehicles not equipped with such an internal charging apparatus and therefore they are more desirable as a source of an electric power supply for emergencies.

Namely, the fifteenth embodiment of the present invention is;

a vehicle according to any one of said eighth to fourteenth embodiments of the present invention, wherein:

said in-vehicle power supply parts further includes an internal charging apparatus for supplying electric power to said electric storage device to charge said electric storage device.

In the above-mentioned hybrid vehicles, as mentioned above, the internal charging apparatus carried in the vehicles can charge the electric storage device carried in the vehicles. Specifically, the hybrid vehicles can drive a power generator, such as a rotation electrical machinery (generator) etc., with the power supplied from a certain power plant carried in the vehicles to generate electric power from the power generator and charge the electric storage device with the electric power. In addition, the electric power generated by driving a power generator with the power supplied from other power plants is generally alternating-current power in many cases. On the other hand, the electric power which can be stored in electric storage device, such as a storage battery and a capacitor etc., is generally a direct current. Therefore, in the vehicles which can charge an electric storage device with an internal charging apparatus, it is desirable to have a power converter for converting the electric power generated from the power generator (alternating-current) into the electric power suitable for the electric storage device (direct current). In addition, as an example of such a power converter, for example, an AC/DC converter etc. can be exemplified.

Therefore, the sixteenth embodiment of the present invention is;

a vehicle according to said fifteenth embodiment of the present invention, wherein:

said internal charging apparatus further includes a power generator for generating electric power with the power supplied from a power plant carried in said vehicle, and a first power converter for converting the electric power generated from said power generator into the electric power suitable for said electric storage device.

By the way, hybrid vehicles are vehicles equipped with an electric motor driven with electric power and an internal-combustion engine driven with kinetic energy converted from the energy generated by combustion of fuel, as power plants. As mentioned above, in a hybrid vehicle (HV), for example, an internal-combustion engine or a regenerating brake carried in HV can drive a motor, which usually functions as a source of power, as a power generator to charge an electric storage device carried in HV.

Namely, the seventeenth embodiment of the present invention is;

a vehicle according to said sixteenth embodiment of the present invention, wherein:

said power plant is an internal-combustion engine.

Moreover, as mentioned above, the vehicles according to the present embodiment can make it possible to transfer of electric power mutually between vehicles and the vehicles exterior under control by a charge-and-discharge management system at normal times, and can make it possible to supply electric power from vehicles to the vehicles exterior without depending on the charge-and-discharge management system in an emergency. As mentioned above, the vehicles according to the present invention switch a normal time and an emergency by whether the first operating part is switched to the first state or I switched to the second state, respectively. As mentioned above, when the first operating part is in the second state, the in-vehicle charge-and-discharge control part detects the second control signal for permitting an electric supply operation to the charge-and-discharge control device from the in-vehicle power supply part without using the charge-and-discharge control signal and controls the vehicle to be in a state where the electric supply operation can be performed without being based on the charge-and-discharge control signal.

That is, the case when the in-vehicle charge-and-discharge control part detects the second control signal corresponds to an emergency. Therefore, in such a case, it is desirable to continue the electric supply operation for longer period by charging the electric storage device with the internal charging apparatus, while supplying electric power stored in electric storage device to the vehicles exterior, as mentioned above. As mentioned above, in order to charge the electric storage device with the internal charging apparatus, it is required to drive a power generator, and it is required to supply power to a power generator from a certain power plant for that purpose.

Therefore, the eighteenth embodiment of the present invention is;

a vehicle according to any one of said sixteenth or seventeenth embodiment of the present invention, wherein:

said in-vehicle charge-and-discharge control part controls said vehicle to be in the state where said power plant can work, when said in-vehicle charge-and-discharge control part detects said second control signal.

As mentioned above, in the vehicles according to the present embodiment, since the power plant can work to drive the power generator to generate electric power and the electric storage device can be charged with the electric power while supplying electric power stored in the electric storage device to the vehicles exterior, the electric supply operation can be continued for a longer period.

By the way, in the vehicles according to the above-mentioned various embodiments of the present invention, the in-vehicle charge-and-discharge control part detects, through the signal pathway, a first control signal for permitting either one of a charge operation to the in-vehicle power supply part from the charge-and-discharge control device using a charge-and-discharge control signal transmitted and received between the in-vehicle charge-and-discharge control part and the charge-and-discharge control device, or an electric supply operation to the charge-and-discharge control device from the in-vehicle power supply part using the charge-and-discharge control signal, when the first operating part prepared in the charge-and-discharge connector is in the first state. When the in-vehicle charge-and-discharge control part thus detects the first control signal, as mentioned above, the in-vehicle charge-and-discharge control part can control the vehicle to be in the state where the charge operation or the electric supply operation can be performed, based on the charge-and-discharge control signal. Specifically, the in-vehicle charge-and-discharge control part can control, for example, a relay etc. prepared in the electric power pathway between the in-vehicle power supply part and the connection part, to constitute a charge pathway required for the charge from the charge-and-discharge control device to the electric storage device which the in-vehicle power supply part includes, or an electric supply pathway required for the electric supply from the electric storage device which the in-vehicle power supply part includes to the charge-and-discharge control device.

In the above, in the charge operation to the in-vehicle power supply part from the charge-and-discharge control device, the charge-and-discharge control device supplies the electric power supplied from the external power supply to the in-vehicle power supply part through the charge-and-discharge connector, and charges the electric storage device. However, when the external power supply is the commercial power supplied to each home, the electric power supplied from the external power supply is alternating-current. On the other hand, the electric power which can be stored in an electric storage device is generally a direct current. Therefore, it is desirable that the in-vehicle power supply part includes a power converter for converting the electric power supplied from the charge-and-discharge control device to the in-vehicle power supply part (alternating-current) into the electric power suitable for the electric storage device (direct current). In addition, as an example of such a power converter, for example, an AC/DC converter etc. can be exemplified.

Therefore, the nineteenth embodiment of the present invention is;

a vehicle according to any one of said eighth to eighteenth embodiments of the present invention, wherein:

said in-vehicle power supply part further includes a second power converter for converting the electric power supplied from said charge-and-discharge control device to said in-vehicle power supply part into the electric power suitable for said electric storage device when said charge operation is performed.

On the other hand, as described above, when the in-vehicle charge-and-discharge control part detects the first control signal, as mentioned above, the in-vehicle charge-and-discharge control part can also control the vehicle to be in the state where the electric supply operation can be performed, based on the charge-and-discharge control signal. Moreover, the in-vehicle charge-and-discharge control part detects, through the signal pathway, a second control signal for permitting an electric supply operation to the charge-and-discharge control device from the in-vehicle power supply part without using the charge-and-discharge control signal, when the first operating part is in the second state. When the in-vehicle charge-and-discharge control part thus detects the second control signal, as mentioned above, the in-vehicle charge-and-discharge control part can control the vehicle to be in the state where the electric supply operation to the charge-and-discharge control device from the in-vehicle power supply part can be performed, without being based on the charge-and-discharge control signal. In any case, the in-vehicle charge-and-discharge control part can control, for example, a relay etc. prepared in the electric power pathway between the in-vehicle power supply part and the connection part, to constitute an electric supply pathway required for the electric supply from the electric storage device which the in-vehicle power supply part includes to the charge-and-discharge control device.

In the above, in the electric supply operation to the charge-and-discharge control device from the electric storage device which the in-vehicle power supply part includes, the electric power supplied from the electric storage device which the in-vehicle power supply part includes is supplied to the charge-and-discharge control device through the charge-and-discharge connector. On this occasion, in the case where the in-vehicle charge-and-discharge control part detects the first control signal, the electric power supplied from the electric storage device which the in-vehicle power supply part includes is supplied to the electric load outside the vehicle under usual control by the charge-and-discharge control device. On the other hand, in the case where the in-vehicle charge-and-discharge control part detects the second control signal, apart from the usual control by the charge-and-discharge control device, the electric power supplied from the electric storage device which the in-vehicle power supply part includes is directly supplied to the electric load outside the vehicle.

However, many of the electric loads outside the vehicles are designed based on an assumption that, for example, the commercial power supplied to each home etc. is used. Namely, in many cases, the power supply electric power which the electric load outside the vehicles needs is alternating-current electric power. On the other hand, the electric power which can be stored in an electric storage device is generally a direct current. Therefore, the electric power supplied from the electric storage device which the in-vehicle power supply part includes is also a direct current. For this reason, it is desirable that the in-vehicle power supply part includes a power converter for converting the electric power supplied from the electric storage device which the in-vehicle power supply part includes to the charge-and-discharge control device (direct current) into the electric power suitable for the electric load outside the vehicles (alternating-current). In addition, as a specific example of such a power converter, for example, a DC/AC inverter etc. can be exemplified.

Therefore, the twentieth embodiment of the present invention is;

a vehicle according to any one of said eighth to nineteenth embodiments of the present invention, wherein:

said in-vehicle power supply part further includes a third power converter for converting the electric power supplied from said in-vehicle power supply part to said charge-and-discharge control device into the electric power suitable for the electric load outside said vehicle for the electric power to be supplied when said electric supply operation is performed.

By the way, as mentioned above, the present invention has one more another objective to provide a charge-and-discharge management system which makes it possible to transfer of electric power mutually between vehicles and the vehicles exterior under control by the charge-and-discharge management system at normal times, and makes it possible to supply electric power from vehicles to the vehicles exterior without depending on the charge-and-discharge management system in an emergency. Then, the charge-and-discharge management systems according to various embodiments of the present invention will be explained hereinafter. However, the contents which overlap with the matter that has been already described in the above-mentioned explanation about the charge-and-discharge connectors and vehicles according to various embodiments of the present invention will be omitted and only the constituent elements of each embodiment will be listed.

First, the twenty-first embodiment of the present invention is;

a charge-and-discharge management system, which includes a vehicle, an external power supply outside the vehicle, a charge-and-discharge control device outside the vehicle, and a charge-and-discharging connector, wherein;

said vehicle includes:
an in-vehicle power supply part comprising an electric storage device,
an in-vehicle charge-and-discharge control part which controls transfer of electric power between said vehicle and said charge-and-discharge control device, and
a connection part into which said charge-and-discharge connector is fitted, said charge-and-discharge connector includes:
an electric power pathway through which electric power is transmitted between said in-vehicle power supply part and said charge-and-discharge control device,
a signal pathway through which a control signal is transmitted to at least one of said in-vehicle charge-and-discharge control part or said charge-and-discharge control device, and a first operating part which is changed at least between a first state and a second state, and in a state where said charge-and-discharge connector and said connection part are electrically connected, said in-vehicle charge-and-discharge control part detects through said signal pathway:

a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or a second control signal for permitting an electric supply operation to said charge-and-discharge control device from said in-vehicle power supply part without using said charge-and-discharge control signal, when said first operating part is in said second state, and said in-vehicle charge-and-discharge control part controls said vehicle to be in:

a state where said charge operation or said electric supply operation can be performed based on said charge-and-discharge control signal, when said first control signal is detected, or a state where said electric supply operation can be performed without being based on said charge-and-discharge control signal, when said second control signal is detected.

Moreover, the twenty-second embodiment of the present invention is;

a charge-and-discharge management system according to said twenty-first embodiment of the present invention, wherein:

said signal pathway includes a CPLT signal pathway, through which a CPLT signal used for control of said charge-and-discharge management system is transmitted, and said charge-and-discharge control signal includes said CPLT signal.

Furthermore, the twenty-third embodiment of the present invention is;

a charge-and-discharge management system according to said twenty-second embodiment of the present invention, wherein:

said charge-and-discharge connector is configured so that said CPLT signal pathway is shut off when said first operating part is in said second state, and in the case where the first operating part is in the second state, said in-vehicle charge-and-discharge control part uses the fact that said CPLT signal is not detected, as one of the conditions for controlling said vehicle to be in the state where said electric supply operation can be performed.

In addition, the twenty-fourth embodiment of the present invention is;

a charge-and-discharge management system according to any one of said twenty-first to twenty-third embodiments of the present invention, wherein:

said charge-and-discharge connector is configured so that:

said signal pathway includes a connection signal pathway through which a cable connection signal whose property changes according to the fitting state of said charge-and-discharge connector and said connection part is transmitted, and said property of said cable connection signal in a specific fitting state indicates a first property when said first operating part is in said first state, and indicates a second property different from said first property when said first operating part is in said second state, and in the case where the first operating part is in the second state, said in-vehicle charge-and-discharge control part uses the fact that said property of said cable connection signal in said specific fitting state indicates said second property, as one of the conditions for controlling said vehicle to be in the state where said electric supply operation can be performed.

Moreover, the twenty-fifth embodiment of the present invention is;

a charge-and-discharge management system according to said twenty-fourth embodiment of the present invention, wherein:

said charge-and-discharge connector:

further includes a second operating part which is changed at least between a first state and a second state, and is configured so that, in the case where said first operating part is in said second state, said property of said cable connection signal in said specific fitting state indicates said second property when said second operating part is in said first state, and indicates a third property different from both of said first property and said second property when said second operating part is in said second state, and in the case where the first operating part is in the second state, said in-vehicle charge-and-discharge control part control said vehicle to perform said electric supply operation when said property of said cable connection signal in said specific fitting state changes between said second property and said third property.

Furthermore, the twenty-sixth embodiment of the present invention is;

a charge-and-discharge management system according to any one of said twenty-fourth or twenty-fifth embodiment of the present invention, wherein:

said property of said cable connection signal which changes according to the fitting state of said charge-and-discharge connector and said connection part is the impedance of said connection signal pathway.

In addition, the twenty-seventh embodiment of the present invention is;

a charge-and-discharge management system according to said twenty-sixth embodiment of the present invention, wherein:

said cable connection signal and said connection signal pathway are compliant with J1772 standard enacted by SAE.

Moreover, the twenty-eighth embodiment of the present invention is;

a charge-and-discharge management system according to any one of said twenty-first to twenty-seventh embodiments of the present invention, wherein:

said in-vehicle power supply parts further includes an internal charging apparatus for supplying electric power to said electric storage device to charge said electric storage device.

Furthermore, the twenty-ninth embodiment of the present invention is;

a charge-and-discharge management system according to said twenty-eighth embodiment of the present invention, wherein:

said internal charging apparatus further includes a power generator for generating electric power with the power supplied from a power plant carried in said vehicle, and a first power converter for converting the electric power generated from said power generator into the electric power suitable for said electric storage device.

In addition, the thirtieth embodiment of the present invention is;

a charge-and-discharge management system according to said twenty-ninth embodiment of the present invention, wherein:

said power plant is an internal-combustion engine.

Moreover, the thirty-first embodiment of the present invention is;

a charge-and-discharge management system according to any one of said twenty-ninth or thirtieth embodiment of the present invention, wherein:

said in-vehicle charge-and-discharge control part controls said vehicle to be in the state where said power plant can work, when said in-vehicle charge-and-discharge control part detects said second control signal.

Therefore, the thirty-second embodiment of the present invention is;

a charge-and-discharge management system according to any one of said twenty-first to thirty-first embodiments of the present invention, wherein:

said in-vehicle power supply part further includes a second power converter for converting the electric power supplied from said charge-and-discharge control device to said in-vehicle power supply part into the electric power suitable for said electric storage device when said charge operation is performed.

In addition, the thirty-third embodiment of the present invention is;

a charge-and-discharge management system according to any one of said twenty-first to thirty-second embodiments of the present invention, wherein:

said in-vehicle power supply part further includes a third power converter for converting the electric power supplied from said in-vehicle power supply part to said charge-and-discharge control device into the electric power suitable for the electric load outside said vehicle for the electric power to be supplied when said electric supply operation is performed.

By the way, as mentioned above, in the charge-and-discharge management systems according to the above-mentioned various embodiments of the present invention, when the first operating part is in the second state, a second control signal for permitting an electric supply operation from the in-vehicle power supply part to the charge-and-discharge control device without using the charge-and-discharge control signal, is detected by the in-vehicle charge-and-discharge control part through the signal pathway. Thus, as mentioned above, when the in-vehicle charge-and-discharge control part detects the second control signal, the in-vehicle charge-and-discharge control part can control the vehicle to be in a state where the electric supply operation can be performed without being based on the charge-and-discharge control signal. Specifically, the in-vehicle charge-and-discharge control part can control, for example, a relay etc. disposed in the electric power pathway between the in-vehicle power supply part and the connection part to constitute an electric supply pathway required for the electric supply from the electric storage device which the in-vehicle power supply part includes to the charge-and-discharge control device.

However, as mentioned above, when the first operating part is in the second state, a situation where the charge-and-discharge control device cannot operate normally due to, for example, the power failure in the time of a disaster, etc. or failure of a charge-and-discharge control device, etc. can be assumed. Also in such cases, there is a possibility that electric power may not be appropriately supplied to the electric load outside the vehicles from the charge-and-discharge control device even though electric power is supplied from the electric storage device which the in-vehicle power supply part includes to the charge-and-discharge control device through the same electric power pathway as normal times.

Therefore, in the cases as described above, it is desirable that the electric power is not supplied from the electric storage device which the in-vehicle power supply part includes to the charge-and-discharge control device through the same electric power pathway as normal times, but is supplied, for example, directly to a distribution board connected to an electric socket to which the electric load outside the vehicles can be connected, an electric socket for emergencies, etc. not through the charge-and-discharge control device.

In order to directly supply the electric power from the electric storage device which the in-vehicle power supply part includes to, for example, a distribution board connected to an electric socket to which the electric load outside the vehicles can be connected, an electric socket for emergencies, etc. unlike at normal times, a charge-and-discharge management system can be constituted so that the electrical connection between the charge-and-discharge connector and the charge-and-discharge control device can be shut off, and the charge-and-discharge connector and, for example, a divergent pathway leading to, for example, the distribution board connected to the electric socket to which the electric load outside the vehicles can be connected, the electric socket for emergencies, etc. can be electrically connected, for example, by operating an operating part, such as a change-over switch, which is disposed at a diverging point at which a divergent pathway leading to, for example, the distribution board connected to the electric socket to which the electric load outside the vehicles can be connected, the electric socket for emergencies, etc. is prepared, for example, on a pathway electrically connecting the charge-and-discharge connector and the charge-and-discharge control device.

In addition, in the above-mentioned case, the in-vehicle charge-and-discharge control part controls the vehicle to be in the state where the electric supply operation to the charge-and-discharge control device from the in-vehicle power supply part can be performed without being based on the charge-and-discharge control signal as mentioned above. Therefore, since the control signal transmitted between the in-vehicle charge-and-discharge control part and the charge-and-discharge control device is not used (cannot be used), the pathway electrically connecting the diverging point (operating part) and, for example, the distribution board connected to the electric socket to which the electric load outside the vehicles can be connected, the electric socket for emergencies, etc. does not need to include the signal pathway through which the control signal is transmitted.

Namely, the thirty-fourth embodiment of the present invention is;

a charge-and-discharge management system according to any one of said twenty-first to thirty-third embodiments of the present invention, wherein:

said charge-and-discharge management system further includes a third operating part which intervenes in a pathway electrically connecting said charge-and-discharge connector and said charge-and-discharge control device and can change the electrical connection state of said charge-and-discharge connector and said charge-and-discharge control device at least between a first state and a second state, and when said third operating part is in said first state, said charge-and-discharge connector and said charge-and-discharge control device are electrically connected, when said third operating part is in said second state, said charge-and-discharge connector and said charge-and-discharge control device are electrically shut off and at least said electric power pathway which said charge-and-discharge connector includes and an electric power pathway through which electric power can be supplied to the electric load outside the vehicle are electrically connected.

By the way, the third operating part may change between the pathway electrically connecting the charge-and-discharge connector and the charge-and-discharge control device and the pathway electrically connecting the charge-and-discharge connector and the electric load outside the vehicle, as mentioned above, for example, by a user's operation. However, there is a possibility that asynchrony in electric power unsynchronizing may occur among these electric powers when the electric supply from the electric storage device which the in-vehicle power supply part includes to the charge-and-discharge control device is started, and the charge from the charge-and-discharge control device to the electric storage device which the in-vehicle power supply part includes is also started, based on the change state of the first operating part and the change operation of the second operating part, in the state where the third operating part is in the first state (namely, state where the charge-and-discharge connector and the charge-and-discharge control device are electrically connected), for example, due to an incorrect operation by a user, etc.

Therefore, in the charge-and-discharge management system according to the present embodiment, it is desirable that the first operating part and the third operating part are configured to interlock with each other so that the third operating part is in the first state when the first operating part is in the first state, and the third operating part is in the second state when the first operating part is in the second state.

Namely, the thirty-fifth embodiment of the present invention is;

a charge-and-discharge management system according to said thirty-fourth embodiment of the present invention, wherein:

said first operating part and said third operating part interlock with each other so that said third operating part is in said first state when said first operating part is in said first state, and said third operating part is in said second state when said first operating part is in said second state.

In addition, in the charge-and-discharge management system according to the present embodiment, the specific technique for interlocking the first operating part and the third operating part is not especially limited. For example, the first operating part and the third operating part may be I may be mechanically connected to interlock the first operating part and the third operating part. Alternatively, a control part for controlling the first operating part and the third operating part so that the state of both of the operating parts to change in conjunction with each other may be separately prepared, for example, by constituting both of the operating parts with relays and monitoring the state of both of the operating parts.

As an actual operation, the electric supply operation from the in-vehicle power supply part to the vehicles exterior without using a charge-and-discharge control signal may be started by first setting the third operating part as the second state, next setting the first operating part which the charge-and-discharge connector includes as the second state, then fitting the charge-and-discharge connector into the connection part which the vehicle includes and connecting them, and thereafter performing an ignition-on operation of the vehicle, and finally performing the predetermined operations as mentioned above to the second operating part.

By the way, the charge-and-discharge control device included in the charge-and-discharge management system according to various embodiments of the present invention may have a function corresponding to what is called "an Energy Management System (EMS)." As an example of EMS, for example, what is called "the Home Energy Management System (HEMS)" may be exemplified, which includes the electric storage device included in EMS and the electric storage device included in vehicles and is intended to reduce electric power cost and $CO_2$ emissions by, for example, storing the grid-connected electric power from a commercial power in the electric storage device included in EMS and the electric storage device included in vehicles in the hours when an electricity rate is cheap, using the electric power stored in the electric storage device included in EMS for the hours when the electricity rate is high, or using the electric power stored in the electric storage device included in vehicles depending on the specified priority, in accordance with the priority specified by a user (for example, cost reduction, $CO_2$ emissions reduction, completion time setup of charge of vehicles, etc.), in a general dwelling etc. Moreover, what is called "the Building Energy Management System (BEMS)" which applies the similar system to an office building etc. is beginning to be utilized. The present invention is applicable also to such EMS.

Moreover, in the charge-and-discharge connector, vehicle, and charge-and-discharge management system according to various embodiments of the present invention, it is needless to say that various safety measures can be incorporated, such as suspension of charge and discharge on blocking of a control signal and data communications, prevention of incorrect-departing of vehicles in the midst of charge and discharge, suspension of charge and discharge on detection of a short circuit, protection function for preventing the over-current due to a short circuit etc., or prompt shut-off of pathway (by opening a relay etc.) and prompt lowering of voltage at the time of disconnection of a connector in case of an electric power pathway and a signal pathway through which voltage higher than a predetermined value is impressed.

Hereafter, referring to accompanying drawings, the specific embodiments of the present invention will be explained. However, the explanation which will be described below is absolutely intended for exemplification, and the scope of the present invention should not be interpreted as what is limited to the following explanation.

EXAMPLE

1) Configuration of Charge-and-Discharge Management System

FIG. 1 is a schematic view showing the configuration of the charge-and-discharge management system according to one embodiment of the present invention, as mentioned above. As shown in FIG. 1, the charge-and-discharge management system 100 according to the present example includes the charge-and-discharge connector 110, the vehicle 120, the external power supply (160) outside the vehicle, the charge-and-discharge control device 130 outside the vehicle, and the electric load 140 outside the vehicle. The charge-and-discharge control device 130 and the electric load 140 are installed inside of the house 150. Moreover, commercial power (160) for home use is connected to the charge-and-discharge control device 130, and electricity is usually supplied to each electric load 140 through the charge-and-discharge control device 130.

That is, the charge-and-discharge management system 100 according to the present example may be a charge-and-discharge management system corresponding to, for example, the above-mentioned HEMS. In this case, the charge-and-discharge control device 130 is equipped with an external electric storage device (not shown), and is intended to reduce electric power cost and $CO_2$ emissions by, for example, storing the grid-connected electric power from a commercial power in the external electric storage device (not shown) or the electric storage device (123a) included in the vehicle 120 in the hours when an electricity rate is cheap, using the electric power stored in the external electric storage device (not shown) for the hours when the electricity rate is high, or using the electric power stored in the electric storage device (123a) included in the vehicle 120 depending on the specified priority, in accordance with the priority specified by a user (for example, cost reduction, $CO_2$ emissions reduction, completion time setup of charge of vehicles, etc.), through a user interface with which the charge-and-discharge control device 130 is equipped.

Figure 2:
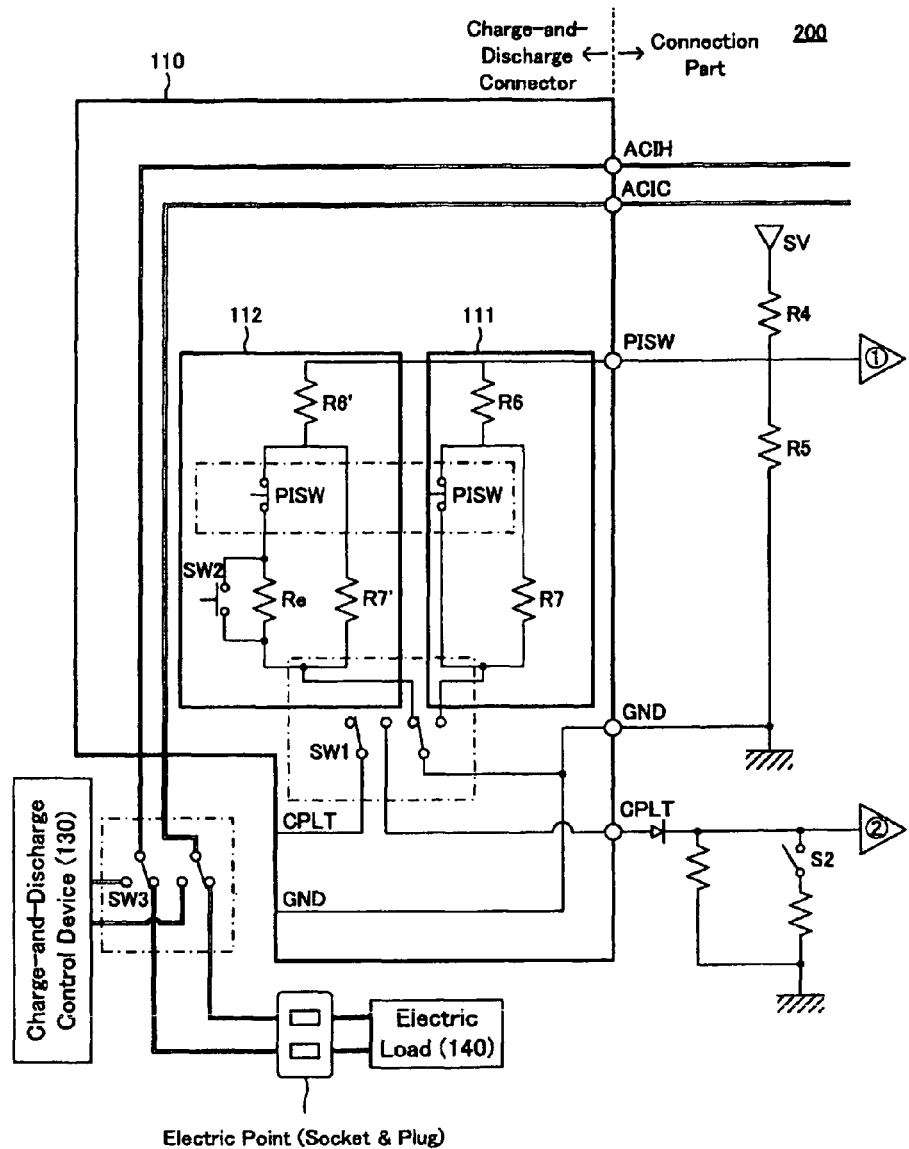
FIG. 2 is a circuit diagram showing the outline of the electric power pathway and signal pathway that the charge-and-discharge connector according to one embodiment of the present invention includes.

2) Schematic Configuration of Electric Power Pathway and Signal Pathway in Charge-and-Discharge Connector FIG. 2 is a circuit diagram showing the outline of the electric power pathway and signal pathway that the charge-and-discharge connector according to one embodiment of the present invention includes, as mentioned above. In addition, in the circuit diagram shown in FIG. 2, the change-over switches SW1 and SW3 (corresponding to the first operating part and the third operating part, respectively) surrounded with a dashed-dotted line mean that two signal pathways in each area all interlock and change in conjunction. Moreover, the circuit diagram shown in FIG. 2 will be explained as a circuit diagram of the charge-and-discharge connector 110 contained in the charge-and-discharge management system 100 shown in FIG. 1. Therefore, in the present example, the details of the charge-and-discharge connector 110 will be explained, referring to both FIG. 1 and FIG. 2.

The charge-and-discharge connector 110 according to the present example includes the PISW signal pathways 111 and 112 which present the impedance according to the fitting state into the connection part 121 with which the vehicles 120 are equipped, and the signal pathway CPLT which transmits the control signal transmitted and received between the vehicle 120 and the charge-and-discharge control device 130, and the electric power pathways ACIH and ACIC which transmit the electric power delivered and received between the vehicle 120 and the charge-and-discharge control device 130. The terminals PISW, CPLT, ACIH, ACIC, and GND (shown as large white circles in FIG. 2) of the pathways with which the charge-and-discharge connector 110 is equipped, are constituted to contact the terminal of each of pathway corresponding thereto and establish the electrical connection of each pathway between the vehicle 120 and the charge-and-discharge control device 130 on fitting into the connection part (shown in right-hand side of FIG. 2) with which the vehicle 120 is equipped.

Moreover, in the present example, in the charge-and-discharge connector 110, the PISW signal pathway 111 is a PISW signal pathway for normal times, and the PISW signal pathway 112 is a PISW signal pathway for emergencies, and it is configured so that which PISW signal pathway should be opened up (conducted) can be changed by first operating part SW1 with which the charge-and-discharge connector 110 is equipped. Moreover, the first operating part SW1, with which the charge-and-discharge connector 110 is equipped, is constituted to open up (conduct) the CPLT signal pathway when the PISW signal pathway for normal times is opened up (the first state) and shut off the CPLT signal pathway when the PISW signal pathway for emergencies is opened up (the second state).

Thereby, the charge-and-discharge connector 110 according to the present example shut off the signal pathway (CPLT signal pathway) through which transmits the control signal (CPLT signal) transmitted and received between the vehicles 120 and the charge-and-discharge control device 130, when the first operating part SW1 is in the second state (emergency). On the other hand, regarding the PISW signal pathway, the PISW signal pathway for normal times is shut off by the first operating part SW1, and the electrical connection of the PISW signal pathway for emergencies is established.

As a result, the in-vehicle charge-and-discharge control part 122 with which the vehicle 120 is equipped detects that it is in the state where the electric supply operation which does not use the control signal transmitted and received between the vehicle 120 and the charge-and-discharge control device 130 is possible and, apart from the control by the charge-and-discharge control device 130, constitutes the electric power pathway inside the vehicle 120 so that electric supply operation which supplies the electric power stored in the electric storage device 123a with which the vehicle 120 is equipped to the vehicle exterior through the charge-and-discharge connector 110 can be performed.

On the other hand, in the state shown in FIG. 1, the state of the third operating part SW3 is set as the second state (the electric power pathway on the bottom side in FIG. 1) corresponding to an emergency. Thereby, the electric power supplied from the electric storage device 123a with which the vehicle 120 is equipped is not supplied to the electric power pathway which leads to the charge-and-discharge control device 130 from the third operating part SW3, but can be supplied directly to the electric load 140 outside the vehicle. In addition, in order to actually start the electric supply to the electric load 140 outside the vehicle, what is necessary is to perform predetermined operations (for example, operation to change the state two or more times within a predetermined period etc.) to the second operating part SW2 contained in the PISW signal pathway 112 for emergencies, and just to command to start an electric supply to the in-vehicle charge-and-discharge control part 122 with which the vehicle 120 is equipped.

Thus, in accordance with the charge-and-discharge connector 110 according to the present example, the electric power supplied from the electric storage device with which the vehicle 120 is equipped can be supplied to the electric load 140 outside the vehicle, apart from the control by the charge-and-discharge control device 130, by operating the third operating part SW3 to change to the second state (the electric power pathway on the bottom side in FIG. 1), and thereafter operating the first operating part SW1 to be set as the second state (left-hand side in FIG. 2) to change the PISW signal pathway to that for emergencies (112).

In addition, when the charge-and-discharge management system 100 according to the present example is intended to operate in the usual state under control by the charge-and-discharge control device 130, what is necessary is to operate the third operating part SW3 to change to the first state (the electric power pathway on the upper side in FIG. 1), and thereafter operating the first operating part SW1 to be set as the first state (right-hand side in FIG. 2) to change the PISW signal pathway to that for normal times (111).

Although some embodiments with certain configurations have been described for the purpose of description of the present invention, as mentioned above, it is not necessary to say that the scope of the present invention is not limited to these exemplary embodiments and modification can be properly added within the range of the matter described in the claims and specification.

What is claimed is:

1. A charge-and-discharge management system that includes a charge-and-discharge connector, a vehicle, an external power supply outside the vehicle, and a charge-and-discharge control device outside the vehicle, and electrically connects said vehicle and said charge-and-discharge control device to enable transfer of electric power between said vehicle and said charge-and-discharge control device, wherein;

said vehicle includes:
an in-vehicle power supply part comprising an electric storage device,
an in-vehicle charge-and-discharge control part which controls transfer of said electric power between said vehicle and said charge-and-discharge control device, and
a connection part into which said charge-and-discharge connector is fitted,
said charge-and-discharge connector includes:
an electric power pathway through which said electric power is transmitted between said in-vehicle power supply part and said charge-and-discharge control device,
at least one signal pathway through which a control signal is transmitted to at least one of said in-vehicle charge-and-discharge control part or said charge-and-discharge control device, and
a first operating part which is changed at least between a first state and a second state, and
said charge-and-discharge connector is configured so that, in a state where said charge-and-discharge connecter and said connection part are electrically connected, said in-vehicle charge-and-discharge control part detects through said at least one signal pathway:
a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or
a second control signal for permitting another electric supply operation to said charge-and-discharge control device from said in-vehicle power supply part without using said charge-and-discharge control signal, when said first operating part is in said second state.

2. The charge-and-discharge management system according to claim 1, which is configured so that:
said at least one signal pathway includes a CPLT signal pathway, through which a CPLT signal that is a control signal for distinguishing whether an electric power cable is for charge or for electric supply and used for control of said charge-and-discharge management system is transmitted, and
said charge-and-discharge control signal includes said CPLT signal.

3. The charge-and-discharge management system according to claim 2, which is configured so that:
said CPLT signal pathway is shut off when said first operating part is in said second state.

4. The charge-and-discharge management system according to claim 1, which is configured so that:
said at least one signal pathway includes a connection signal pathway through which a cable connection signal whose property changes according to the fitting state of said charge-and-discharge connector and said connection part is transmitted, and
said property of said cable connection signal in a specific fitting state indicates a first property and thereby functions as said first control signal when said first operating part is in said first state, and indicates a second property different from said first property and thereby functions as said second control signal when said first operating part is in said second state.

5. The charge-and-discharge management system according to claim 4, wherein:
said charge-and-discharge connector further includes a second operating part which is changed at least between a third state and a fourth state, and
said charge-and-discharge connector is configured so that, in the case where said first operating part is in said second state, said property of said cable connection signal in said specific fitting state indicates said second property when said second operating part is in said third state, and indicates a third property different from both of said first property and said second property when said second operating part is in said fourth state.

6. The charge-and-discharge management system according to claim 4, wherein:
said property of said cable connection signal which changes according to the fitting state of said charge-and-discharge connector and said connection part is the impedance of said connection signal pathway.

7. The charge-and-discharge management system according to claim 6, wherein:
said cable connection signal and said connection signal pathway are compliant with J1772 standard enacted by SAE.

8. A charge-and-discharge management system including a vehicle, an external power supply outside the vehicle, a charge-and-discharge control device outside the vehicle, and a charge-and-discharging connector, and enables transfer of electric power with said vehicle and said charge-and-discharge control device through said charge-and-discharge connector, wherein;
said vehicle includes:
an in-vehicle power supply part comprising an electric storage device,
an in-vehicle charge-and-discharge control part which controls transfer of said electric power between said in-vehicle power supply part and said charge-and-discharge control device, and
a connection part into which said charge-and-discharge connector is fitted,
said charge-and-discharge connector includes:
an electric power pathway through which said electric power is transmitted between said in-vehicle power supply part and said charge-and-discharge control device,
at least one signal pathway through which a control signal is transmitted to at least one of said in-vehicle charge-and-discharge control part or said charge-and-discharge control device, and
a first operating part which is changed at least between a first state and a second state, and
in a state where said charge-and-discharge connector and said connection part are electrically connected, said in-vehicle charge-and-discharge control part detects through said at least one signal pathway:
a first control signal for permitting either one of a charge operation to said in-vehicle power supply part from said charge-and-discharge control device using a charge-and-discharge control signal transmitted and received between said in-vehicle charge-and-discharge control part and said charge-and-discharge control device, or an electric supply operation to said charge-and-discharge control device from said in-vehicle power supply part using said charge-and-discharge control signal, when said first operating part is in said first state, or
a second control signal for permitting another electric supply operation to said charge-and-discharge control device from said in-vehicle power supply part without using said charge-and-discharge control signal, when said first operating part is in said second state, and
said in-vehicle charge-and-discharge control part controls said vehicle to be in:
a state where said charge operation or said electric supply operation can be performed based on said charge-and-discharge control signal, when said first control signal is detected, or
a state where said electric supply operation can be performed without being based on said charge-and-discharge control signal, when said second control signal is detected.

9. The charge-and-discharge management system according to claim 8, wherein:
said at least one signal pathway includes a CPLT signal pathway, through which a CPLT signal that is a control signal for distinguishing whether an electric power cable is for charge or for electric supply and used for control of said charge-and-discharge management system is transmitted, and
said charge-and-discharge control signal includes said CPLT signal.

10. The charge-and-discharge management system according to claim 9, wherein:
said charge-and-discharge connector is configured so that said CPLT signal pathway is shut off when said first operating part is in said second state, and
in the case where the first operating part is in the second state, said in-vehicle charge-and-discharge control part uses the fact that said CPLT signal is not detected, as one of the conditions for controlling said vehicle to be in the state where said electric supply operation can be performed.

11. The charge-and-discharge management system according to claim 8, wherein:
said charge-and-discharge connector is configured so that:
said at least one signal pathway includes a connection signal pathway through which a cable connection signal whose property changes according to the fitting state of said charge-and-discharge connector and said connection part is transmitted, and
said property of said cable connection signal in a specific fitting state indicates a first property and thereby functions as said first control signal when said first operating part is in said first state, and indicates a second property different from said first property and thereby functions as said second control signal when said first operating part is in said second state, and
in the case where the first operating part is in the second state, said in- vehicle charge-and-discharge control part uses the fact that said property of said cable connection signal in said specific fitting state indicates said second property, as one of the conditions for controlling said vehicle to be in the state where said electric supply operation can be performed.

12. The charge-and-discharge management system according to claim 11, wherein:
said charge-and-discharge connector:
further includes a second operating part which is changed at least between a third state and a fourth state, and
is configured so that, in the case where said first operating part is in said second state, said property of said cable connection signal in said specific fitting state indicates said second property when said second operating part is in said third state, and indicates a third property different from both of said first property and said second property when said second operating part is in said fourth state, and
in the case where the first operating part is in the second state, said in- vehicle charge-and-discharge control part control said vehicle to perform said electric supply operation when said property of said cable connection signal in said specific fitting state changes between said second property and said third property.

13. The charge-and-discharge management system according to claim 11, wherein:
said property of said cable connection signal which changes according to the fitting state of said charge-and-discharge connector and said connection part is the impedance of said connection signal pathway.

14. The charge-and-discharge management system according to claim 13, wherein:
said cable connection signal and said connection signal pathway are compliant with J1772 standard enacted by SAE.

15. The charge-and-discharge management system according to claim 8, wherein:
said in-vehicle power supply parts further includes an internal charging apparatus for supplying electric power to said electric storage device to charge said electric storage device.

16. The charge-and-discharge management system according to claim 15, wherein:
said internal charging apparatus further includes a power generator for generating electric power with the power supplied from a power plant carried in said vehicle, and a first power converter for converting the electric power generated from said power generator into the electric power suitable for said electric storage device.

17. The charge-and-discharge management system according to claim 16, wherein:
said power plant is an internal-combustion engine.

18. The charge-and-discharge management system according to claim 16, wherein:
said in-vehicle charge-and-discharge control part controls said vehicle to be in the state where said power plant can work, when said in-vehicle charge-and-discharge control part detects said second control signal.

19. The charge-and-discharge management system according to claim 8, wherein:
said in-vehicle power supply part further includes a second power converter for converting the electric power supplied from said charge-and-discharge control device to said in-vehicle power supply part into the electric power suitable for said electric storage device when said charge operation is performed.

20. The charge-and-discharge management system according to claim 8, wherein:
said in-vehicle power supply part further includes a third power converter for converting the electric power supplied from said in-vehicle power supply part to said charge-and-discharge control device into the electric power suitable for the electric load outside said vehicle for the electric power to be supplied when said electric supply operation is performed.

\* \* \* \* \*